May 16, 1933.  E. W. BLEAM  1,908,727
MEAT SAWING APPARATUS
Filed May 12, 1931  5 Sheets-Sheet 1

INVENTOR.
BY Edgar William Bleam
Cornelius A. Ehret
ATTORNEY.

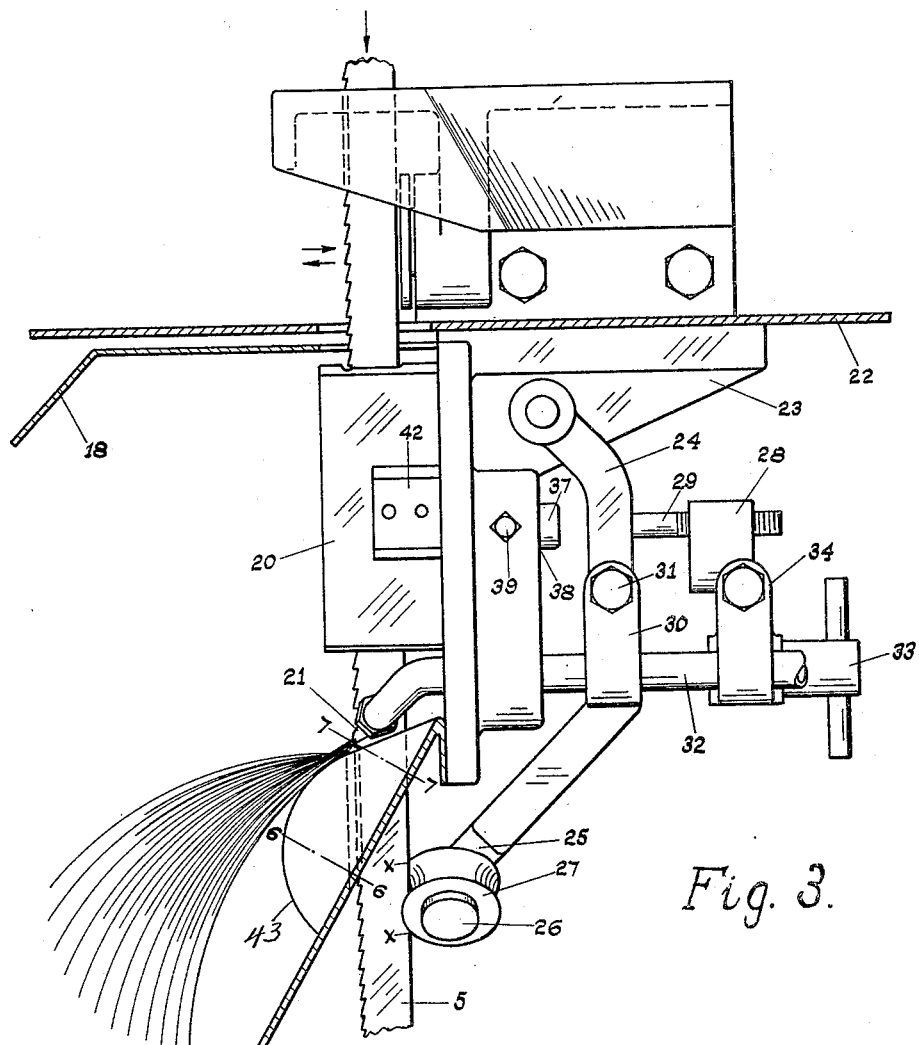
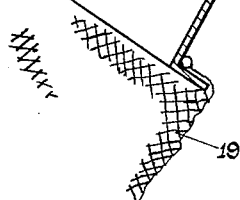
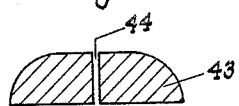

May 16, 1933.     E. W. BLEAM     1,908,727
MEAT SAWING APPARATUS
Filed May 12, 1931     5 Sheets-Sheet 4

INVENTOR.
Edgar William Bleam
BY
Cornelius D. Ebret
ATTORNEY.

Patented May 16, 1933

1,908,727

UNITED STATES PATENT OFFICE

EDGAR WILLIAM BLEAM, OF PHILADELPHIA, PENNSYLVANIA, ASSIGNOR TO ATLAS MANUFACTURING COMPANY, A CORPORATION OF DELAWARE

MEAT SAWING APPARATUS

Application filed May 12, 1931. Serial No. 536,710.

My invention relates to meat sawing apparatus and particularly to maintaining the saw blade free of accumulations of meat fibres, gristle, bone dust, and the like.

In accordance with my invention, one or more nozzles for delivering a blast, as of air, to remove the adhering material from the saw, and particularly from the gullets of the saw teeth, are mounted on structure movable with the saw to maintain the proper position of the nozzles with respect to the saw as the latter is moved by feed of the meat.

Further in accordance with my invention, the meat removed from the saw is prevented from accumulating adjacent the saw and again coming in contact with it beyond the nozzles, by structure cooperating with the blast from the nozzles to insure a substantial area or space adjacent the region of exit of the saw from the collecting chamber for the removed material, which is at all times substantially free of any adhering particles.

My invention further resides in the features of combination, construction and arrangement hereinafter described and claimed.

For an understanding of my invention and for an illustration of a preferred form thereof, reference is to be had to the accompanying drawings in which.

Figure 2:
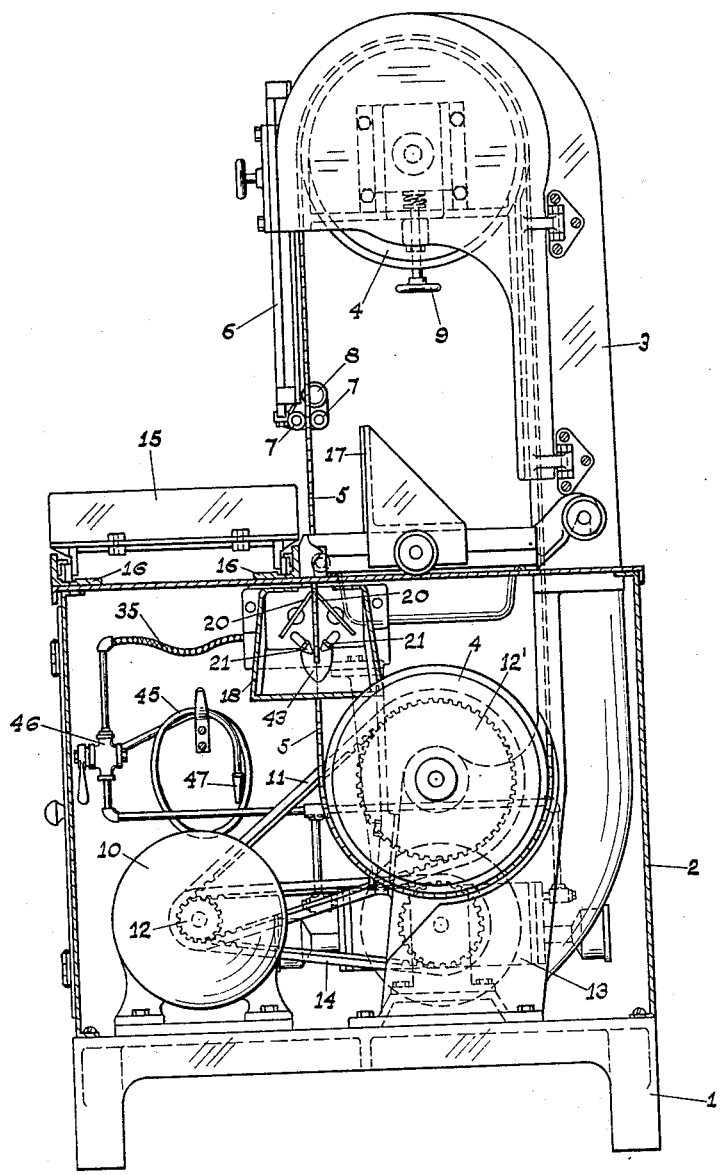
Fig. 2 is a front elevational view in section, of the machine shown in Fig. 1.

Fig. 3 on enlarged scale is a side elevation of the saw cleaning mechanism shown in Fig. 2.

Figure 4:
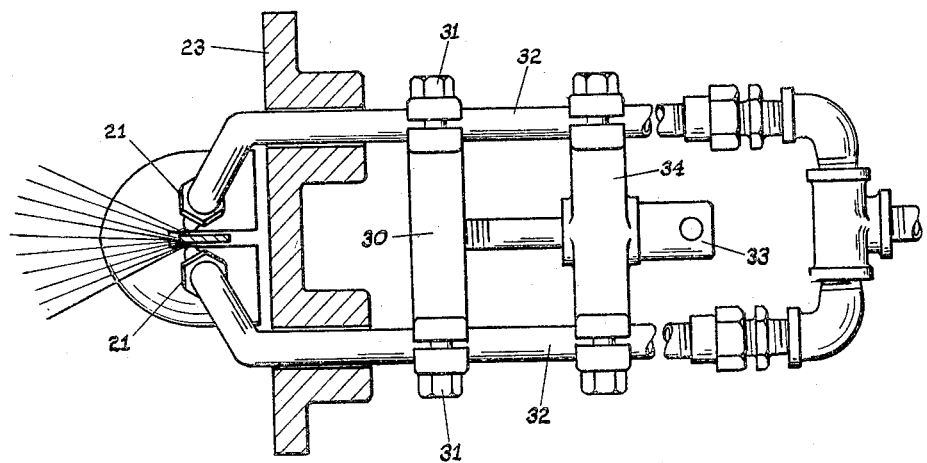

Fig. 4 on enlarged scale is a plan view of the nozzle arrangement illustrated in Fig. 3.

Figure 5:
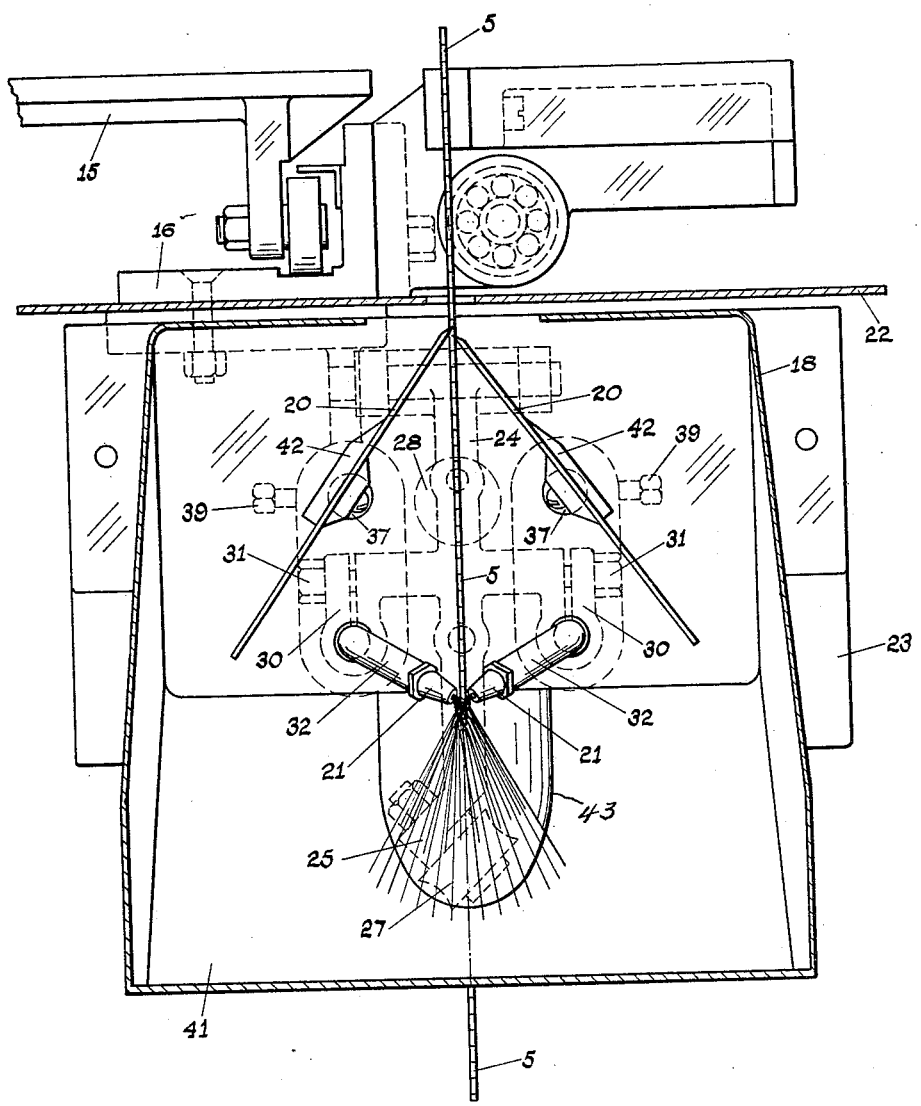

Fig. 5 on enlarged scale is a front elevational view of the saw cleaning apparatus shown in Fig. 3.

Figs. 6 and 7 are sectional views taken on the lines 6—6 and 7—7 respectively of Fig. 3.

Figure 8:
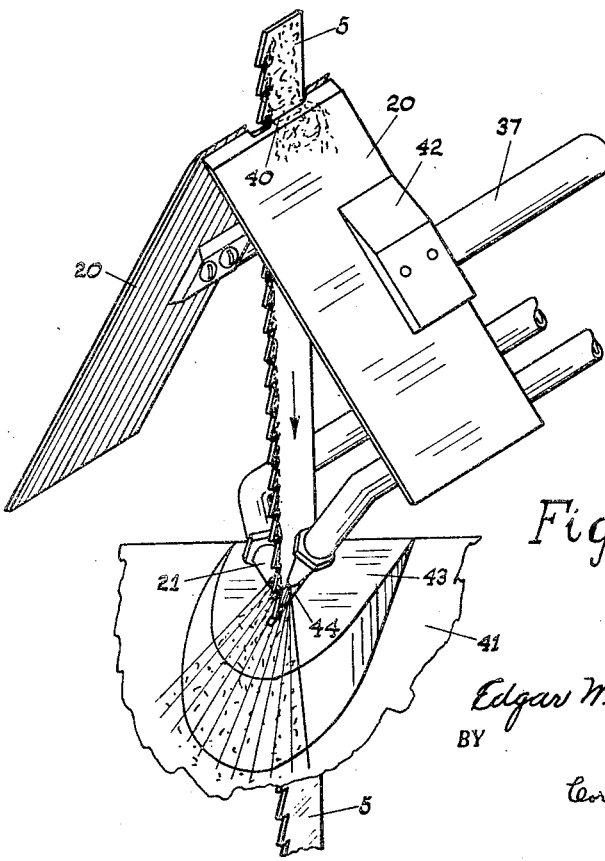

Fig. 8 in perspective, discloses the relations and functions of the scrapers and nozzles shown in preceding figures.

Figure 1:
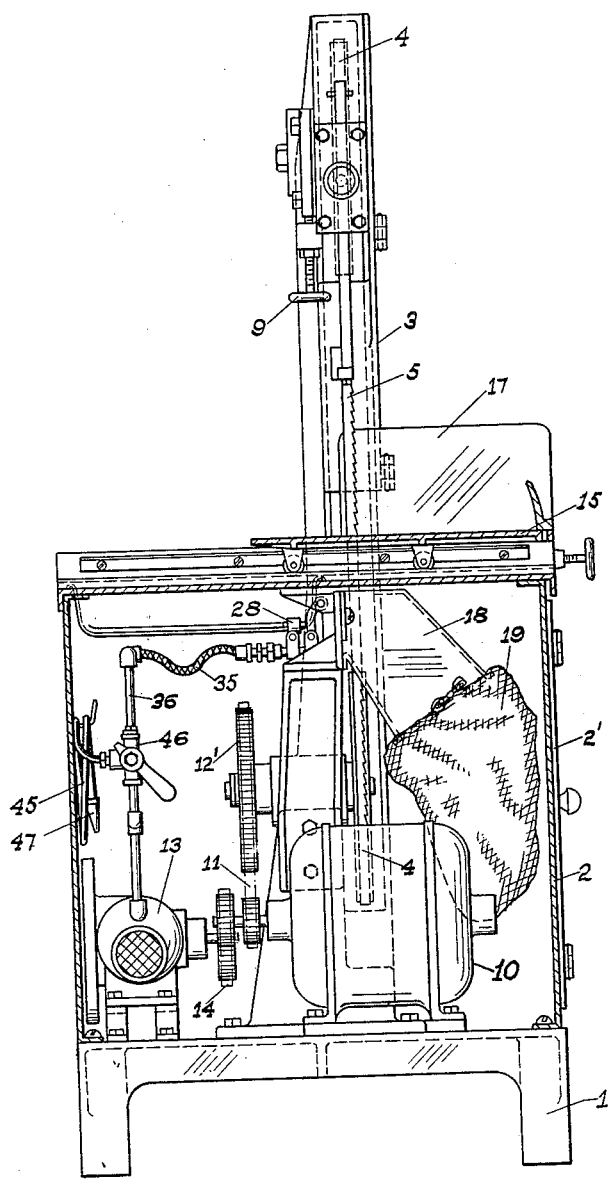
Fig. 1 is a side elevational view, partly in section, of a meat cutting machine, constructed in accordance with my invention.

Referring to the drawings, particularly Figs. 1 and 2, the base 1 supports a housing or enclosing structure 2, and a standard 3 which carries the wheels 4, 4 for the band saw 5. The adjustable slide 6 carries the usual guide rolls 7, 7 and 8 for the saw blade. The tension of the blade is regulated in the ordinary manner by a hand-wheel 9.

The saw is driven by a motor 10 in any suitable manner, for example, as illustrated, by a chain 11 which meshes with gears 12 and 12' mounted respectively on the motor shaft and the shaft of the lower wheel 4. The same motor is utilized for driving air compressor 13, by means of a chain 14. Both the motor and compressor are disposed within the housing 2 so that the machine is a self-contained unit and it is only necessary to connect a cord from the motor to the nearest outlet of commercial current for operation of the machine.

The meat to be cut is carried by the carriage 15 which is guided for movement parallel to the sides of the saw by the guide rails 16, 16, with the portion thereof to be cut from the remainder abutting the adjustable stop member 17.

The saw, after leaving the meat, passes through a collection chamber or chute 18, whose open end is in communication with a removable, porous receptacle or bag 19. Both the chute and bag are disposed within the housing 2, provided with a door 2', which when open, permits removal of the bag 19, and access to the interior of the compartment for any purpose.

Within the collection chamber 18 are disposed the scraper members 20, 20 for cleaning the sides of the saw blade and for disturbing fibres caught in the gullets of the teeth, and nozzles 21, 21 for directing a blast of air to clean the teeth and to remove material between them. The mechanism thus far generally described is similar to that disclosed and claimed in co-pending application Serial No. 490,500, filed October 22, 1930, now Patent No. 1,870,774, issued Aug. 9, 1932 and utilizes the method of cleaning a saw by fluid jets broadly disclosed and claimed in co-pending application Serial No. 338,848, filed February 9, 1929, now Patent No. 1,812,942, issued July 7, 1931.

My improved cleaning arrangement is more clearly illustrated in Figs. 3 to 5. To the under side of the top plate 22 of housing 2 is suitably secured a supporting bracket 23 from which is suspended the pivoted member 24 terminating in an offset extension 25 which carries the stud shaft 26 of a guide roller 27. The radius of curvature of the roller groove, and the angle of its axis of rotation is such that it has continuous engagement with the back of the saw blade 5 between the points $x$—$x$. Further, the peripheries of the opposite ends of the roller engage opposite sides of the saw to prevent it from moving or bending sidewise. The weight 28 threaded upon or otherwise adjustably secured to the extension 29 extending from the pivoted member 24, biases the roller 27 continuously in engagement with the saw.

To the outer ends of the arms 30 which extend from opposite sides of the pivoted member 24 are adjustably clamped, as by bolts 31, the tubes 32 terminating in the nozzles 21. For adjusting the positions of the nozzles with respect to the saw teeth, the bolts 31 are temporarily loosened, and the screw 33 which threadably engages the pivoted member 24 and whose head abuts against the cross member 34 connecting and clamped to the tubes 32, is rotated in the desired direction.

As meat is fed into the saw, the latter may move backwardly to greater or less extent, as indicated by the upper horizontal arrow, Fig. 3, the extent of movement depending upon the rapidity with which the saw is freeing itself by the cutting action, and the speed at which the meat is fed to the saw. In actual operation and particularly during cutting, the saw weaves back and forth as indicated by the horizontal arrows, Fig. 3. As the back of the saw by its engagement with the roller 27 also moves the nozzles 21, the relative position of the nozzle and the saw remain constant at the desired adjustment irrespective of varying positions of the saw, whereas in the arrangement of the prior machines, in which the nozzles were fixed, the relative position between the nozzle and saw teeth was changed to such extent by the movement of the saw with varying feeds of meat, that the cleaning action of the jets was impaired. The adjustment for most efficient cleaning action of the jets is a fairly critical one and the oscillation or movement of the saw was more than sufficient to disturb the adjustment and resulted in poor cleaning action. By the present arrangement the nozzles follow the saw in its movement and proper adjustment of the nozzles with respect to the saw is at all times maintained. To permit this movement the conduit 35 connecting the supply pipe 36 from the compressor to the T head connected to the individual supply pipes 32 of the nozzles, is flexible.

The scraper blades 20 are each secured to the end of a shaft 37 which is received by a hole 38 through the downwardly extending portion of the bracket member 23. The scrapers are clamped in their adjusted position against the blade by bolts 39 or equivalent, which engage the shafts 37. The resiliency of the scraper blades maintain them in contact with the sides of the saw. The edges of the scrapers preferably overlap slightly, as most clearly shown in Figs. 5 and 8, so that the tension of each of the blades maintains its entire edge 40 in contact with the side of the saw and further ensures this contact though the edge may wear and slightly change the position of the scraping edge. As indicated most clearly in Fig. 8, the upper edges of the blades are recessed so that when the blades are in their adjusted position they form an opening through which the saw passes. The length of the opening is to suitable extent greater than the width of the saw blade to allow for the backward and forward movement of the saw previously referred to. The rear portion of the slot, extending backwardly from the gullets of the saw teeth, is narrow, so that the scraping edges 40 bear against the sides of the saw to remove the accumulated material therefrom. The forward end of the slot is of greater width so as not to strike the teeth which ordinarily have more or less "set."

To the front and rear of the saw the edges of the scrapers form a continuous surface so that material removed from the saw by the scraper edges cannot readily fall into the path of movement of the saw for again contacting with it. In effect the downwardly sloping sides of the scraper blades are deflectors which insure movement of the material scraped from the saw to points or regions within the collection chamber which are substantially removed from the saw blade. As indicated most clearly in Fig. 3, the bottom 41 of the chute or collection chamber is at a sharp angle, so that the material falling from the scrapers continues its downward movement into the collection bag 19 without obstruction by any horizontal or substantially horizontal surfaces. The upper ends of the clamping pieces 42 for the scraper plates are chamfered to avoid piling up of the scrapings on the plates.

The sides of the saw after passing the scrapers, are clean, as idicated in Fig. 8. The scraper blades besides cleaning the sides of the saw to the rear of the teeth disturb the ends of fibres overhanging the gullets of the teeth so that when the teeth continue their movement and pass between the nozzles 21, the teeth and spaces between the teeth are cleaned. The blade upon leaving the collection chamber, as indicated in Fig. 8, is free of all adhering material so that when it again comes in contact with the meat, there is not transferred from the blade to the meat, any substance or material spoiling the appearance of the cut. Further, by keeping the saw clean the speed of cutting is materially increased.

Due to the sticky nature of the material comprising the particles removed from the saw, they tend rapidly to accumulate on surfaces within the collection chamber, including regions adjacent the path of movement of the saw, so that difficulty has been experienced in preventing the fouling of the saw after it has passed the nozzle 21 and before it leaves the collection chamber, particularly after the machine has been in operation for some time, without cleaning of the collection chamber. This difficulty has to great and substantially complete extent been overcome by the provision of the member 43 having a slot 44 through which the saw passes after passing the nozzles. The block 43 is preferably of wood to prevent any possibility of damage to the saw teeth in passing through it. The central portion of the upper surface of the member is flat and on either side is rounded off or convex as shown most clearly in Figs. 6 and 7. The air blast from the nozzles keeps this flat surface, which is inclined downwardly, looking from the back of the saw, free of adhering material at all times and the surface co-acts with the jets to cause most of the removed material to pass directly into the bag. Beyond this zone the curvature or convexity of the member 43 is so great that the weight of any substantial accumulation of the removed material is sufficient to cause it to fall off into the bag or upon the sharply sloped bottom of the chamber. Additionally, the block 43 fills in the space below the nozzles within the collection chamber to avoid the possibility of any accumulation of material adjacent the path of movement of the cleaned blade, as in dead air spaces, or in eddies of the main air stream from the jets.

While the member 43 has been shown as separate from the collection chamber it will be understood that it may be integral with it. For example, if the bottom 41 of the chamber is of sheet metal, it may be shaped, as by a die operation, to simulate the form of block 43. Similarly, if the bottom 41 is a casting, block 43 may be molded integral therewith.

From time to time, as after each removal of the bag 19, it is desirable to clean the collection chamber and other parts of the machine as table members 15, 17, guides 6, 7, 8, etc. This is most readily effected by an air blast, for example from a nozzle 47 at the end of a hose 45 normally coiled and suspended within the housing 2. By manipulation of the two-way valve 46, the air blast from the nozzles 21 may be cut off, and air supplied to nozzle 47 which may be manually manipulated to blow out all the debris clinging to the interior surfaces of the collection chamber and members disposed therein, as the scrapers, and the nozzle tubes 32.

What I claim is:

1. Meat sawing apparatus comprising a saw blade, a collection chamber for material removed from said blade, nozzle structure within said chamber for delivering a blast to remove material adhering to said blade, movable supporting structure for said nozzle structure disposed in part exteriorly of said chamber, and a member carried by said movable supporting structure biased into engagement with said blade exteriorly of said chamber.

2. Meat sawing apparatus comprising a saw blade, a collection chamber for material removed from said blade, a member forming a wall of said chamber, scrapers for removing material from the sides of said saw supported by said member, nozzle structure within said chamber for delivering a blast to remove material adhering to said blade, and structure pivoted externally of said chamber and movable with said blade having an extension projecting through said member for supporting said nozzle structure.

3. Meat sawing apparatus comprising a saw blade, and scrapers for removing material from the sides thereof having overlapping edges recessed to form a slot through which the saw passes.

4. Meat sawing apparatus comprising a saw blade, and scrapers for removing material from the sides thereof having overlapping edges recessed to form a slot through which the saw passes, and which extends to substantial extent beyond the saw to preclude re-engagement of the removed material with the saw.

5. Meat sawing apparatus comprising a saw blade, nozzle structure for directing a fluid jet to remove adhering material from said saw, and a slotted member disposed immediately below said nozzle structure and through which said blade passes whose surface slopes outwardly downwardly from said blade generally in the direction of travel of said fluid jet to prevent accumulation of removed material adjacent said blade.

6. Meat sawing apparatus comprising a saw blade, nozzle structure for directing a fluid jet to remove adhering material from said saw, and a slotted member disposed immediately below said nozzle structure and through which said blade passes having a portion of its surface adjacent the blade continuously cleaned by said jet and the remainder of its surface sloping outwardly and downwardly generally in the direction of travel of said fluid jet to prevent substantial accumulation of removed material.

7. Meat sawing apparatus comprising a saw blade, nozzle structure for directing a fluid jet to remove adhering material from said saw, and a slotted member disposed immediately below said nozzle structure and through which said blade passes having a flat surface adjacent the blade continuously cleaned by said jet and curving outwardly and downwardly from said flat surface generally in the direction of travel of said fluid jet to avoid substantial accumulation of removed material.

8. Meat sawing apparatus comprising a saw blade, a collection chamber for material removed from said blade, nozzle structure with said chamber for directing a fluid jet to remove adhering material from the saw, a slot in said chamber through which the saw blade passes to the exterior of the chamber, and a slotted member through which the blade passes covering said slot in said chamber and coacting with said fluid jet to transport the removed material away from the saw blade to another region within the collection chamber, said slotted member having a surface sloping downwardly and outwardly from said blade generally in the direction of travel of said fluid to prevent accumulation of removed material.

9. Meat sawing apparatus comprising the combination with a saw blade which weaves forwardly and backwardly generally in the plane of the blade, of a movable unit comprising nozzle structure delivering a fluid blast adjacent the teeth of the blade, a member adapted to engage the rear edge of the blade, and means for continuously biasing said member against the blade throughout the forward and backward weaving movements thereof for holding said nozzle structure in fixed position with respect to said teeth throughout said weaving movements of the blade.

10. Meat sawing apparatus comprising the combination with a saw blade which weaves forwardly and backwardly generally in the plane of the blade, of a movable unit comprising nozzles disposed on opposite sides of the blade for delivering fluid blasts adjacent the teeth of the blade, a member adapted to engage the rear edge of the blade, and means for continuously biasing said member against the blade throughout the forward and backward weaving movements thereof for holding said nozzles in fixed position with respect to said teeth throughout said weaving movements of the blade.

11. Meat sawing apparatus comprising the combination with a blade which weaves forwardly and backwardly generally in the plane of the blade, of a movable unit comprising nozzle structure delivering a fluid blast adjacent the teeth of the blade, scraper structure for removing material adhering to the sides of the blade, said scraper structure engaging the saw blade in advance of said fluid blast, said movable unit having a member adapted to engage the rear edge of the blade, and means for continuously biasing said member against the blade throughout the forward and backward weaving movements thereof for holding said nozzle structure in fixed position with respect to said teeth throughout said weaving movements of the blade.

12. Meat sawing apparatus comprising the combination with a blade which weaves forwardly and backwardly generally in the plane of the blade, of a movable unit comprising a nozzle for directing a fluid blast adjacent the teeth of the blade and at an angle to said blade to remove adhering material, means for adjusting said nozzle in a direction parallel to the side of said blade while maintaining said angle, said movable unit having a member adapted to engage the rear edge of the blade, and means for continuously biasing said member against the blade throughout the forward and backward weaving movements thereof for holding said nozzle in fixed position with respect to said teeth throughout said weaving movements of the blade.

13. Meat sawing apparatus comprising the combination with a blade which weaves forwardly and backwardly generally in the plane of the blade, of a movable unit comprising nozzles on opposite sides of said blade disposed in angular relation to each other and to said blade for delivering fluid jets adjacent the teeth of the blade, means for simultaneously adjusting said nozzles in planes substantially parallel to the sides of said blade while maintaining said angular relations of the nozzles with respect to each other and to said blade, said movable unit having a member adapted to engage the rear edge of the blade, and means for continuously biasing said member against the blade throughout the forward and backward weaving movements thereof for holding said nozzles in fixed position with respect to said teeth throughout said weaving movements of the blade.

14. Meat sawing apparatus comprising the combination with a saw blade which weaves forwardly and backwardly generally in the plane of the blade, of a movable unit comprising nozzle structure delivering a fluid blast adjacent the gullets of the teeth of the blade at an incline to the blade, a member engaging the rear edge of the blade, and means for continuously biasing said member against the blade throughout the forward and backward weaving movements thereof for maintaining the blast in its said position with respect to said gullets and blade throughout the weaving movements of the blade.

15. Meat sawing apparatus comprising the combination of a saw blade which weaves forwardly and backwardly generally in the plane of the blade, of a pivoted unit comprising nozzle structure delivering a fluid blast at an incline to the blade adjacent the gullets of the teeth, a member adapted to engage the rear edge of the blade, and means for continuously biasing said member against the blade throughout the forward and backward weaving movements thereof for maintaining the aforesaid position of said blast with respect to the blade and the gullets throughout the weaving movements of the blade.

EDGAR WILLIAM BLEAM.